United States Patent [19]

Osborne

[11] 4,408,993
[45] Oct. 11, 1983

[54] CARD HOLDING TEACHING DEVICE

[76] Inventor: Anne M. Osborne, Rte. 2, Albion, Nebr. 68620

[21] Appl. No.: 350,984

[22] Filed: Feb. 22, 1982

[51] Int. Cl.³ .............................................. G09B 1/06
[52] U.S. Cl. .................................. 434/430; 434/112; 434/172; 40/124.2
[58] Field of Search ...................... 434/112, 172, 430; 40/124, 124.2

[56] References Cited

U.S. PATENT DOCUMENTS 557,182 3/1896 Blaisdell .............................. 434/172
1,401,341 12/1921 McDade .............................. 434/172

FOREIGN PATENT DOCUMENTS 1121715 5/1956 France ................................ 434/172

Primary Examiner—William H. Grieb
Attorney, Agent, or Firm—Hiram A. Sturges

[57] ABSTRACT

A card-holding teaching device especially useful for blind children comprising a stiff body having at least one elongated piece of flexible material extending thereacross, the material having on one side tiny, soft, flexible projections which face the stiff body so that a card with teaching symbols thereon can be easily inserted between the material piece and the body because of the easy yielding of the projections even though they hold the flexible piece away from the body sufficiently for easy insertion by a blind student.

5 Claims, 8 Drawing Figures

CARD HOLDING TEACHING DEVICE

BACKGROUND OF THE INVENTION

Card-holders for use in teaching have had the disadvantage that it is difficult to insert cards in pockets in the holders.

This has been because the material forming the outer side of the pocket has usually been flat and against material forming the stiff body of the holder, whereby there is no easy way to get a card started into the tight space between the two sides of the pocket. This is particularly difficult for blind children because it is sometimes even necessary to reach out and pull the front of the pocket open in order to insert a card between front and back sides of a pocket with prior art holders.

It is an object of this invention to provide a holder which has a "funneling" effect such that it provides a large, long notch for receiving the edge of a card to be inserted and this is accomplished by providing for the flexible material to be of a double thickness and folded at the top so that the rounded edge of the fold forms an easy-to-hit notch.

Another objective hereof is to make the front portion of a pocket of material having a soft surface facing the stiff body for providing soft hair-like projections which allow the card to slide easily by them.

SUMMARY OF THE INVENTION

The main goal of this invention is to provide a card-holding teaching device comprising a stiff body having at least one elongated piece of flexible material extending thereacross, the material having on one side tiny, soft, flexible projections which face the stiff body so that a card with teaching symbols thereon can be easily inserted between the material piece and the body because of the easy yielding of the projections even though they hold the flexible piece away from the body sufficiently for easy insertion by a blind student.

Another goal is to provide for an economical and strong construction by attaching a lower edge of the flexible forward piece of a pocket to the backing by having the lower edge double back upwardly and be glued to the backing on their respective adjacent surfaces. An important goal is to provide the card holder material with a folded top whereby the curvature of its exterior has a guiding effect for guiding a card into the space between the card holder and the stiff body.

DESCRIPTION OF THE PREFERRED EMBODIMENTS

Figure 1:
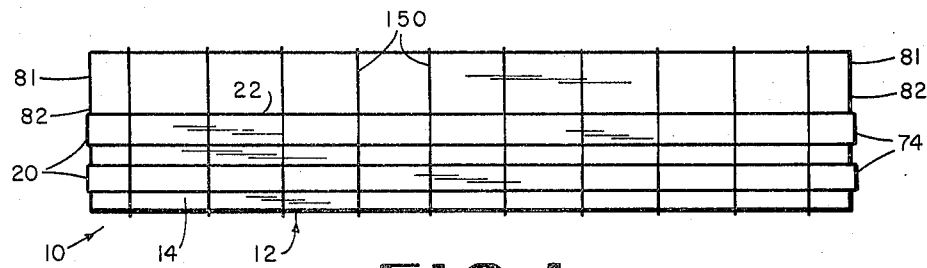
FIG. 1 is a frontal elevation of a card-holder of this invention.

The teaching device of this invention is generally indicated in FIG. 1 at 10 and comprises a stiff body 12 having a forward side 14 having a substantially flat forward surface.

An elongated flexible piece of material 20 which can be called a card holder 20 is disposed with its elongation extending substantially parallel to the forward surface 14.

Figures 2, 3, 4, 5:
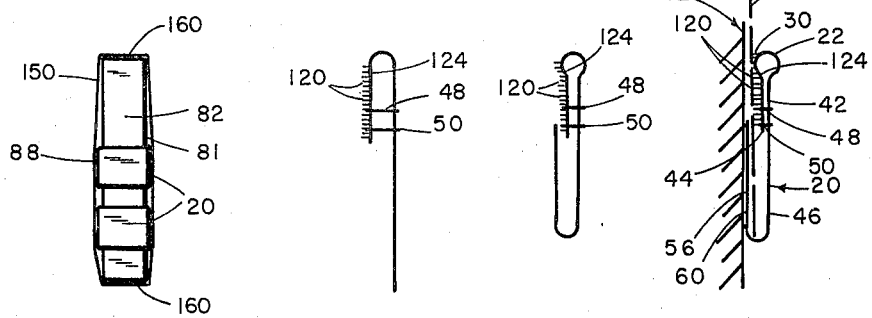
FIG. 2 is a side elevation of a card-holder of this invention.
FIG. 3 shows diagrammatically an initial stage of the making of a flexible forward piece of a pocket.
FIG. 4 shows an intermediate stage of the making of a flexible piece for the pocket.
FIG. 5 shows the forward piece of the pocket glued into place on the body.

The card holder 20 has a card-insertion upper edge 22 disposed adjacent the forward surface 14 of the body defining the upper edge of the card holder 20 to be a card-insertion edge and defining an outer side of a notch 30 between the edge 22 and the stiff body 12 into which a card can be inserted, as seen in dotted lines at 40 in FIG. 5.

The card holder 20 has an upper portion 42 which is in the form of a loop of material having a terminal edge 44 which extends downwardly between an outermost portion 46 of the holder 20 and the stiff body 12. The portion 44 is secured to the outermost portion 46 by stitching which is in an upper row 48 and a lower row 50.

At the lower end of the holder 20 a terminal portion 56 is doubled back up between the forward portion 46 and the stiff body 12 for a substantial distance and glue 60 is placed between the portion 56 and the stiff body 12 all along the length of the elongated holder 20 to hold it to the stiff body 12.

The way the forward portion of holder 20 is held upright is by having its right and left end portions 74 wrapped around the forward corners 81 of the vertical edges 82 of the stiff body 12 and held there by suitable means.

The holder 20 can be simply bent around the forward side corner 81 and glued to the edge 82, or it can be otherwise secured.

The holder 20 can be carried beyond the entire edge 82 and lapped across the back of the stiff body 12, as seen at 88 in FIG. 2, or when it is lapped across the back of the body 12, a cover 90 of soft material can be applied. This is shown only in FIG. 8 and the cover 90 is held to the back of the stiff body 12 by staples 92.

Figures 7, 8:
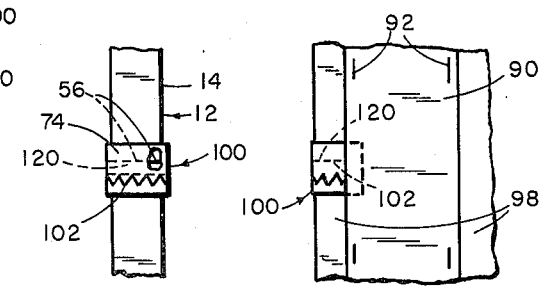
FIG. 7 shows a portion of the holders of FIG. 1 or 6 as it would be seen from the left-hand side thereof.
FIG. 8 is a rear elevation of the modification of FIG. 1 or 6 and, therefore, is as FIG. 7 would be if seen from the right-hand side.

Another modification of the card holder 20 is seen at 100 in FIGS. 7 and 8 in which the holder is simply a loop of material formed by having the portion 56 of the holder stitched to the rearside of the portion 44. Since the stitching 102 goes completely through the holder, portion 46 is also held to the portions 44 and 56 by the same stitching 102, as seen in FIGS. 7 and 8. The upper edge of the portion 56 is, therefore, seen in dotted lines in FIG. 7 and in full lines only where other portions of the holder are broken away to show it.

Another dotted line in FIGS. 7 and 8 is shown at 120 and its purpose is to indicate the upper level of blue which extends therefrom down to the lower part of the holder 100 and between the holder 100 and the stiff body 12.

Figure 6:
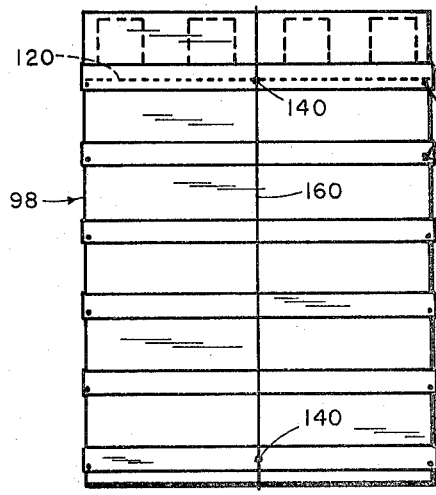
FIG. 6 shows a complete card-holder with cards shown in place in dotted lines and with another dotted line indicating the upper edge of the glued portion of the flexible piece.

If desired, small nails 130 can also extend through the holder, such as seen in FIG. 6.

Dividers are provided, as seen at 150 in FIG. 1, and these dividers extend transversely to the card holders 130, in other words, they extend vertically. The dividers can be suitably attached to the body and can be formed of a woven cord, for example, the attachment being by glue or by nails, the latter being seen at 140, the glue being seen at 160 in FIG. 2.

The dividers 150 can be rubber bands extending completely around the stiff body 12, as seen in FIG. 2, and a divider cord 160 is shown in FIG. 6 and held by the nails 140 to the stiff body 98.

The body 98 has many more horizontal holders 100 than does the much longer, but less high, body 12 of FIG. 1, showing variations which can be used.

It is important that the funneling notch at 30, which is wider at its top side than therebelow, be present because this helps cards to enter through the notch, since the notch is easier to hit with the edge of a card than would be a holder that is tightly up against the stiff body 12. The folded-over nature of the top of the holder 20 makes this possible because its uppermost portion in finished form is, therefore, more bulky. However, the hairlike projections extending toward the stiff body and which are best seen at 120 in FIGS. 3 to 5, and which are present because the material is of furry, soft material, such as velvet, also make it easier for the card to enter because they tend to yield to permit the card to pass. They yield more readily in the denser backing 124 of the velvet or corduroy or other such material used for the holder.

It is important that the dividers 150 or 160 project substantially from the remainder of the teaching device so as to be easily felt by blind students.

I claim:

1. A teaching device comprising: a stiff body having a forward side having a substantially flat forward surface, a card holder formed of a piece of elongated flexible material extending with its elongation substantially parallel to said forward surface, said card holder being disposed adjacent said forward surface and having an elongated card-insertion edge defining a card-insertion side of said card holder, means for attaching said card holder between said body and said holder and in a manner whereby said holder can yield away from said forward surface of said body at the insertion edge of said card holder so that cards may be inserted under said insertion edge by a student, said elongated card holder being formed of a piece of material having its upper elongated edge doubled back upon itself so as to be of double thickness at its upper portion whereby its upper portion is more bulky than portions therebeneath whereby an elongated notch is formed between holder and body, said notch being larger at its uppermost portion so that a card can be inserted thereinto easily.

2. The teaching device of claim 1, said device further comprising at least one other card holder thereon, said card holders extending in parallelism across said body.

3. The teaching device of claim 2 having a divider extending transversely to said card holders and attached to said body and projecting above said body sufficiently for ease of tactile discovery of the positions of said dividers by a blind student.

4. The teaching device of claim 3 having said dividers being rubber bands extending completely around said body so as to grip said body so as to form said attachment in an economical manner and in a manner for easy movement of said dividers to new positions.

5. The teaching device of claim 1 having said material of said card holder having a backing having a projection side having on it tiny soft projections of substantially hair-like flexibility whereby said projections form an area of lesser density than said backing, said material of said holder having its said projection side facing said body forward surface at said insertion edge of said holder so that said projections hold said dense backing away from said body forward surface so as to facilitate the insertion by a student of cards between said body surface and said edge of said holder whereby a card is more easily inserted between said body surface and said backing of said holder by the easier flexing and yielding of said projections than of said denser backing.

* * * * *